United States Patent [19]
Chen et al.

[11] Patent Number: 5,613,048
[45] Date of Patent: Mar. 18, 1997

[54] THREE-DIMENSIONAL IMAGE SYNTHESIS USING VIEW INTERPOLATION

[75] Inventors: Shenchang E. Chen, Sunnyvale; Lance Williams, Cupertino, both of Calif.

[73] Assignee: Apple Computer, Inc., Cupertino, Calif.

[21] Appl. No.: 100,923

[22] Filed: Aug. 3, 1993

[51] Int. Cl.⁶ .................................................. G06T 15/00
[52] U.S. Cl. ........................ 395/119; 395/127; 395/173
[58] Field of Search ........................... 395/119, 120, 395/121, 125, 126, 127, 133, 136–139, 141, 152, 919, 920; 382/286, 289, 293, 300, 302, 307, 308

[56] References Cited

U.S. PATENT DOCUMENTS

| | | | |
|---|---|---|---|
| 4,935,879 | 6/1990 | Ueda | 395/130 |
| 5,187,754 | 2/1993 | Currin et al. | 382/54 |
| 5,193,126 | 3/1993 | Matsuki | 382/44 |
| 5,204,944 | 4/1993 | Wolbers et al. | 395/119 X |
| 5,224,208 | 6/1993 | Miller, Jr. et al. | 395/125 |
| 5,230,039 | 7/1993 | Grossman et al. | 395/130 |
| 5,255,352 | 10/1993 | Falk | 395/125 |
| 5,307,450 | 4/1994 | Grossman | 395/130 X |
| 5,325,475 | 6/1994 | Poggio et al. | 395/133 |
| 5,416,899 | 5/1995 | Poggio et al. | 395/138 X |

*Primary Examiner*—Almis R. Jankus
*Attorney, Agent, or Firm*—Burns, Doane, Swecker & Mathis, L.L.P.

[57] ABSTRACT

Three-dimensional scenes are portrayed from different viewpoints by morphing two-dimensional images. Various key views of a scene are stored, along with offset maps that identify the correspondence of pixels in adjacent stored images. When an intermediate view of the scene is to be presented, one or more stored views are interpolated through a morphing technique. Since the key views and their offset data are pre-stored, the morphing and presentation of new views can be carried out at interactive rates. By providing the ability to quickly compute many closely spaced views, the disclosed morphing technique also facilitates the rapid computation of soft shadows and motion blur in images.

21 Claims, 5 Drawing Sheets

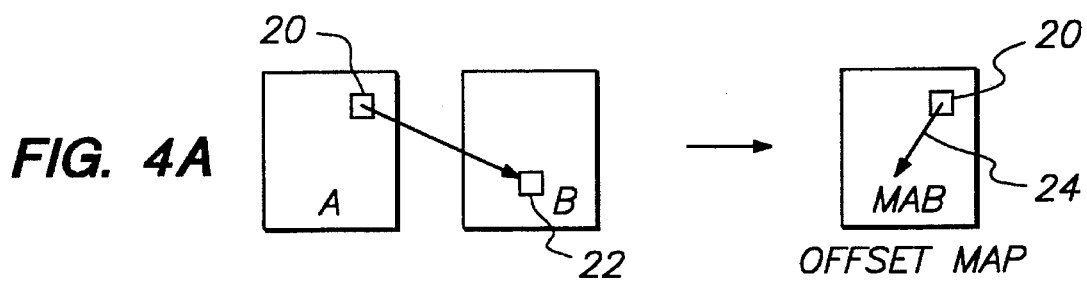
FIG. 4A
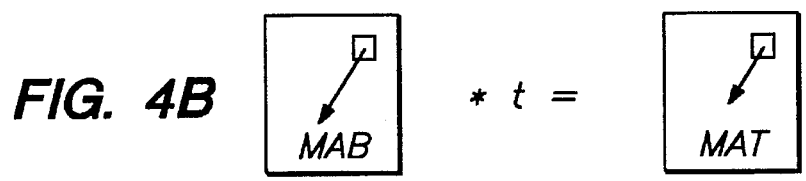
FIG. 4B
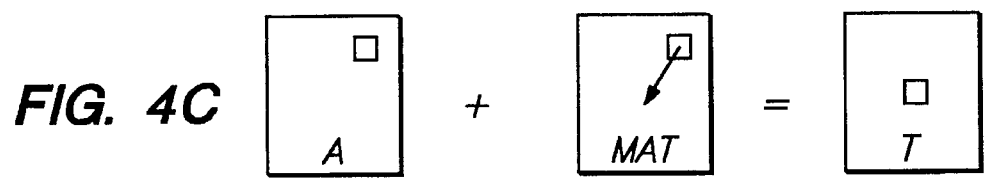
FIG. 4C
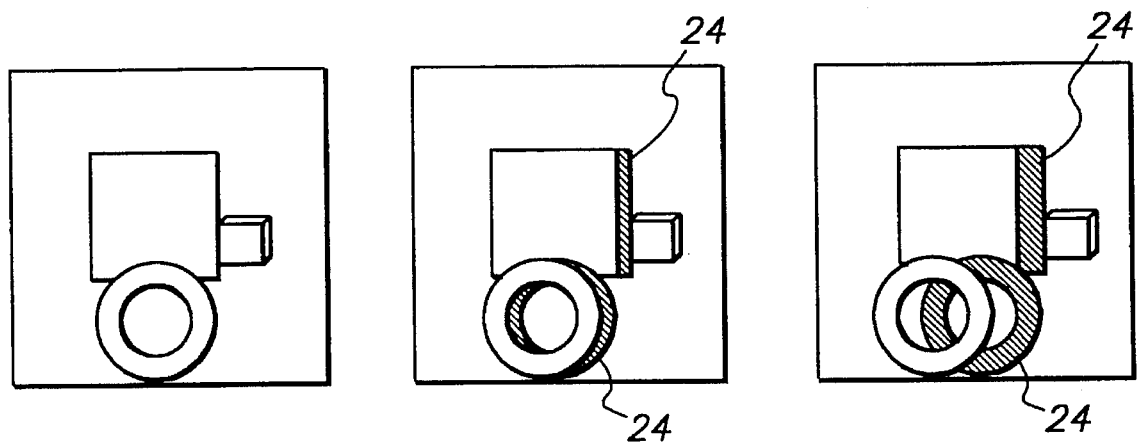
FIG. 5A  FIG. 5B  FIG. 5C

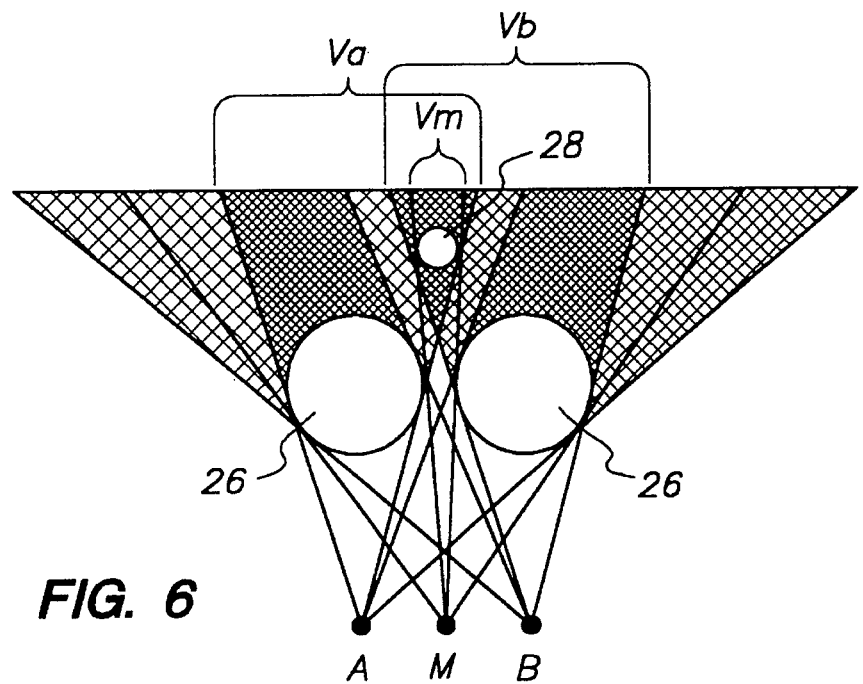
FIG. 6
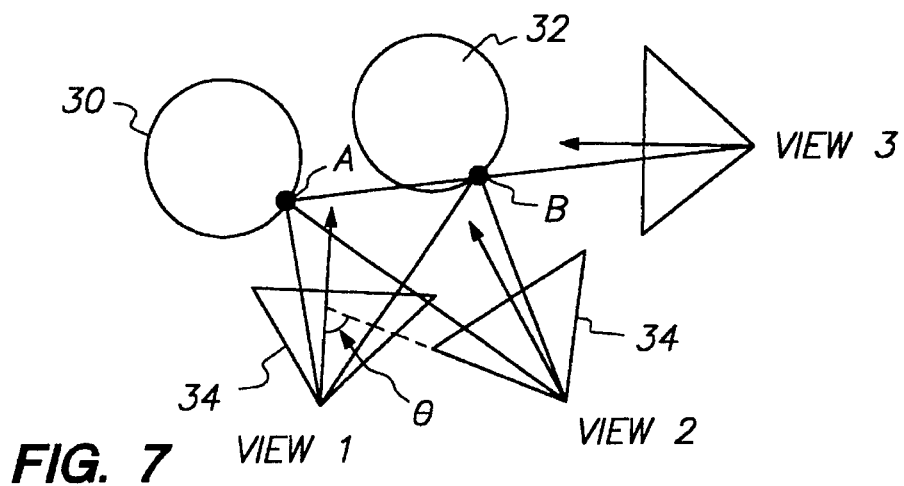
FIG. 7
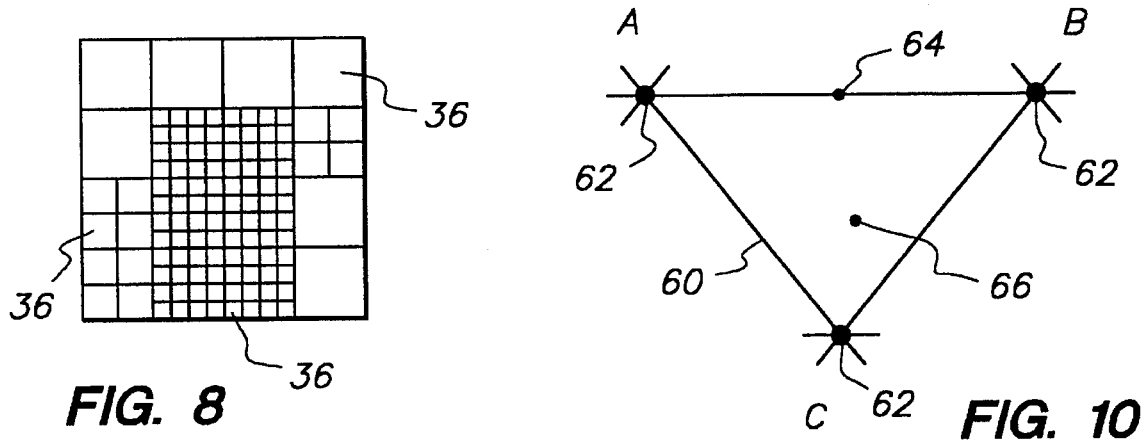
FIG. 8      FIG. 10

THREE-DIMENSIONAL IMAGE SYNTHESIS USING VIEW INTERPOLATION

FIELD OF THE INVENTION

The present invention is directed to the computer generation of three-dimensional graphic scenes from different perspectives, and more particularly to the generation of such scenes through the synthesis of two-dimensional images.

BACKGROUND INFORMATION

The ability to generate a large number of images of an environment from closely spaced viewpoints is a very useful capability. A traditional application of this capability is a flight in the cabin of an aircraft simulator. A more contemporary application is a walk through a virtual environment. In both cases the same scene is displayed from the view of a virtual camera controlled by the user. A different view of a scene must be determined and presented for each different location of the camera. The computation of global illumination effects pertinent to the scene, such as shadows, diffuse and specular inter-reflections, also requires a large number of visibility calculations. A typical approach to this objective is to rely on a computer to repetitively render the scene from the different viewpoints. This approach has two major drawbacks. First, real-time rendering of a complex scene is computationally expensive and usually requires specialized graphics hardware. Second, the rendering time is usually not constant and is dependent on the scene complexity. This problem is particularly critical in simulation and virtual reality applications because of the demand for real-time feedback. Since scene complexity is potentially unbounded, this latter problem will always exist regardless of the available processing power.

A number of approaches have been proposed to address this problem. Most of these approaches use a preprocess technique to compute a subset of the scene visible from a specified viewing region. Only the potentially visible objects are processed in the available time. This approach does not completely solve the problem, however, because there may be viewing regions from which all objects are visible. A different method has been developed to approximate the visibility at a location from adjacent environment maps. In this method, the environment maps are Z-buffered images rendered from a set of discrete viewpoints in a three-dimensional space. Each environment map shows a complete view of the scene from a point. An environment map can take the form of a cubic map, computed by rendering a cube of 90° views radiating from the point. The environment maps are pre-computed and stored with viewpoints arranged in a structured way, such as a three-dimensional lattice. An image from a new viewpoint can be generated by re-sampling the environment maps stored in adjacent locations. The re-sampling process involves rendering the pixels in the environment maps as three-dimensional polygons from the new viewpoint. In this approach, the rendering time is proportional to the environment map resolutions and is independent of the scene complexity. However, the requirement that samples from the maps be regenerated as three-dimensional polygons imposes substantial overhead, and may require special-purpose hardware.

Accordingly, it is desirable to provide a technique for rapidly generating images from nearby viewpoints which is independent of scene complexity and which does not require specialized hardware to implement, to enable a continuous sequence of new images to be generated rapidly on a real-time basis.

SUMMARY OF THE INVENTION

In accordance with the present invention, these objectives are achieved through the use of view interpolation to generate intermediate images from stored images that are taken from nearby viewpoints. The view interpolation is based on techniques that are similar to image morphing.

More particularly, a plurality of images are stored which respectively correspond to the views of a scene from different locations. To generate the view from an intermediate viewpoint between those locations, adjacent images are morphed to create the new image. Maps which identify the correspondence between any two adjacent images are pre-computed and stored. These maps are employed during the morphing process, to thereby allow the image generation to be carried out at interactive rates.

To accelerate the morphing process, a block compression technique is employed to compress the maps, thereby reducing the number of computations that are performed in the generation of a new image. In addition, though proper selection of the stored images, the visibility priority of pixels within an image can be made view independent, thereby eliminating the need to resolve visibility during the morphing step.

The mapping operation enables other results to be achieved more rapidly as well. Many computer graphic renderings are computed much more slowly than real time, but rely on the capability of creating many subsidiary images from closely spaced viewpoints to depict complex effects of light and shadow in a single final image. In such situations, the pictures created by the mapping techniques of the present invention can be used instead of much more expensive traditional rendering. For example, a sequence of mapped views can be constructed to portray soft shadows that result in a scene from an extended light source. In addition, blurring due to motion of an object within a scene can be computed more efficiently.

These, as well as other features and advantages of the invention are explained in greater detail hereinafter with reference to specific examples illustrated in the accompanying drawings.

BRIEF DESCRIPTION OF THE DRAWINGS

FIGS. 4A–4C depict the sequence of general steps that are carried out in the morphing of an image;

FIGS. 5A–5C show a sequence of related images, illustrating holes that can result during image interpolation;

FIG. 6 is a ray trace diagram which depicts the manner in which holes can be formed in an image;

FIG. 7 is an illustration of a scene that is viewed from three respective viewpoints, depicting the feature of view-independent visibility priority;

FIG. 8 is an illustration of an image frame, depicting quadtree blocks;

FIG. 10 is a graph of a portion of an image array, depicting the locations of different viewpoints;

DETAILED DESCRIPTION

As described previously, the present invention is directed to the generation of images representing the views of a three-dimensional scene from different perspectives, such as different locations of a virtual camera. Depending upon the particular application, the camera might be movable in one-dimensional, two-dimensional or three-dimensional space. To facilitate an understanding of the fundamental principles which underlie the present invention, it is first described with reference to examples of movement of the camera in one-dimensional and two-dimensional space. Furthermore, in these preliminary examples, the scene that is being viewed is assumed to be static, and all changes which occur in the scene are a result of camera movement.

Figure 1:
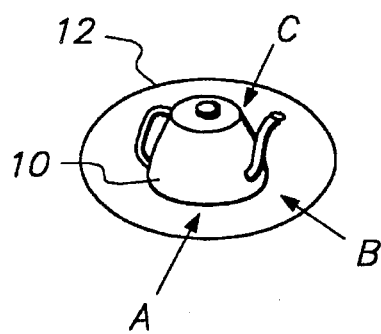
FIG. 1 is a perspective view of an object constituting a scene to be viewed, along with a path for various viewpoints.

The scene to be viewed could comprise a single, three-dimensional object, such as a teapot 10 shown in FIG. 1. A ring 12 surrounding the object 10 illustrates the path of movement of a virtual camera through which the scene is viewed. Three positions along this path, displaced by 90° from one another, are respectively indicated by the arrows labelled A, B and C.

Figure 2:
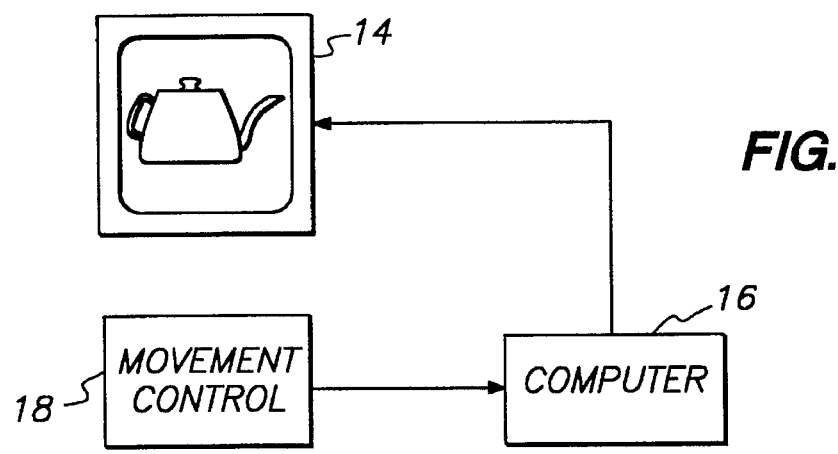
FIG. 2 is a block diagram of a system for presenting views in accordance with the present invention.

In practice, with reference to FIG. 2, the viewed scene is actually a two-dimensional image that is presented on a suitable display 14, such as a monitor for a computer system, a television set, or any other suitable display arrangement. The generation of the image is carried out under the control of a computer 16. The movement of the virtual camera, to present different views of the scene, is controlled by the viewer through a suitable input device 18. This input device could comprise, for example, a joystick in a simulator, a head position detector in a virtual reality system, cursor control keys on a keyboard, or a mouse. If the viewer inputs a command for the camera to move to the right, the viewpoint will move from position A, for example, toward position B. The image presented on the display 14 changes along with the movement of the camera, i.e. objects in the scene will move in the opposite direction. In the case of the teapot 10 shown in FIG. 1, it will appear to rotate in a direction from right to left.

Figure 3:
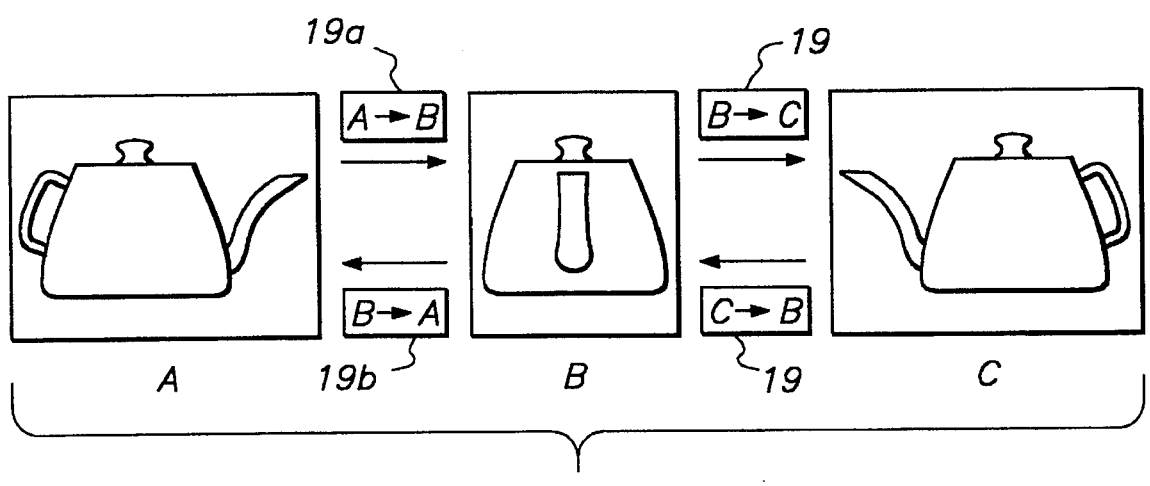
FIG. 3 is an illustration of three stored views of the scene of FIG. 1, showing the correspondence maps that are generated for the stored views.

In accordance with the present invention, selected views of a scene, from different viewpoints, are recorded. In the example of FIG. 1, the view of the object 10 from each of the positions A, B and C is stored in a memory of the computer 16. Each of these three views is represented in FIG. 3. These views can be computer-generated images, artists' renditions, or digitized versions of respective photographic images. Once each of these views has been stored, the image from any viewpoint between any two of the recorded locations can be obtained by interpolation of two adjacent stored images. Thus, the user's view of the scene is not limited to the prestored images. Rather, the scene can be viewed from any viewpoint within a continuous range defined by the stored images, providing a more realistic presentation.

In accordance with the present invention, the interpolation is carried out through image morphing. Generally speaking, image morphing is a simultaneous interpolation of shape and texture. The morphing technique involves two basic steps. In the first step, a correspondence is established between two images. This step is usually the most difficult part of the morphing technique. Typically, the correspondence is established by a human operator. The operator might, for example, define a set of corresponding points or line segments within a pair or set of images. An algorithm is then employed to determine the correspondence, or mapping, of the remaining points of the images. The second basic step in the process is to employ the correspondence mapping to interpolate the shape of each image toward the other, according to the particular intermediate image to be formed. The morph is completed by blending the pixel values of the two images by the same respective coefficients.

This technique, as applied to the present invention, is illustrated in FIGS. 4A–4C. In FIG. 4A, a pair of images are respectively labelled A and B. In the first step of the image morphing process, a pixel 20, or group of pixels, is identified in one of the images, and the location of the same pixel or group of pixels is determined in the second image. In the example of FIG. 4A, pixel 20 in image A is located in image B at the position identified by the reference character 22. The displacement of the pixel 20 in going from image A to image B is used to form an offset map $M_{ab}$. In essence, the offset map is comprised of vectors, such as the vector 24, which identify the displacement of each pixel in going from the source image (A) to a destination image (B).

In the second step of the process, an interpolated offset map is determined for an intermediate viewing position that is located between the respective viewpoints for the images A and B. Referring to FIG. 4B, the product of the offset map $M_{ab}$ and a coefficient t is computed to determine an interpolated offset map $M_{at}$. The coefficient t represents the location of the viewing position for which the interpolated map is computed. For example, the coefficient t can be the ratio of (a) the distance between the intermediate viewing position and the viewing position for a source image A, relative to (b) the total distance between the viewing positions for the source image A and a destination image B, respectively. Once the interpolated map $M_{at}$ is determined, its vectors are applied to the pixels of the source image A, to result in an intermediate view T, as shown in FIG. 4C. In other words, the pixels from the source image A are moved to their interpolated locations, as defined by the map $M_{at}$, to create the interpolated image T.

As noted previously, each of the images A, B and C from various viewpoints is stored in the memory of the computer 16. In addition, to reduce real-time processing requirements, the offset maps which describe the correspondence between each two adjacent images are also precomputed and stored. In practice, a pair of bi-directional maps are stored for each pair of adjacent images. Referring again to FIG. 3, one map 19a identifies the correspondence between images in going from image A to image B, and the other map 19b identifies the correspondence in going from image B to image A. Thus, each of the two images A and B can act as a source image and a destination image.

In going from a source image to an interpolated image, two or more pixels in the source image may map to the same pixel location in the interpolated image. To resolve visibility, the z-coordinate of each of these pixels can be compared to one another, and only the pixel having the nearest (most proximal) z-coordinate (as measured from the location of the camera) is displayed.

In a conventional morphing process, two deformed images are computed, i.e., one going from the source image to the destination image and one going from the destination image to the source image. Once these two deformed images have been determined, they are crossed-dissolved to produce the final interpolated image. In the practice of the present invention, the morphing occurs between different views of the same scene or object, rather than between completely different images, and the surface shading of the same object is view independent. As a result, there is no strict need to cross-dissolve plural deformed images. However, cross-dissolving can still be employed where the z values are identical (or within a threshold distance), to provide smoother interpolation.

When one-directional mapping alone is used to compute the interpolated image, holes may occur in the final image. These holes are created at every target pixel to which no source sample is transformed. These holes appear first at the steep slopes in the depth map of an image as it is transformed, where adjacent pixels have widely differing depths, and where the mapping causes local image expansion. For example, FIGS. 5A–5C illustrate a scene that is viewed from different viewpoints respectively moving to the right. The shaded regions 24 in FIGS. 5B and 5C indicate holes, i.e. pixels in the interpolated images that have no correspondence in the original source image.

One method to fill the holes is to interpolate the colors or offset vectors of adjacent pixels. To identify holes, the destination image can be first filled with a predetermined background color. This background color is "reserved" as a marker, and is restricted from all prestored source images. After the interpolated offset map is applied to the original image, the hole pixels will retain the background color. New colors for these hole pixels can be computed by interpolating the colors of non-background pixels that are adjacent to or otherwise in the neighborhood of the hole pixels. Alternatively, the offset vectors of the neighborhood pixels can be interpolated. The interpolated offset can be used with reference back to the source image, to obtain a new sample color.

Holes can also arise from objects that are invisible in each of the source images but visible in the destination image. An example is shown in FIG. 6. In this example, two large objects 26 appear in the foreground of the scene, and a smaller object 28 is located behind them, in a hole region that is not visible from either of the source viewpoints A and B. The hole region of concern is the intersection of the umbra regions Ua, Ub cast by each of the viewpoints A and B, and the visible region Vm from an intermediate viewpoint M. The small object 28 in the hole region is completely missed by the two source images from points A and B, although it should be visible from the viewpoint M. The problem of holes, such as illustrated in FIG. 6, can be reduced by using multiple source images to minimize the umbra regions. The closer the two source viewpoints are placed to one another, the greater the reduction in the number of holes.

As a further feature of the invention, certain criteria can be employed in the selection of views to eliminate, or at least substantially reduce, the need to interpolate and compare the z coordinates of each pixel to determine view priority. FIG. 7 illustrates a scene containing two objects 30 and 32. This scene is viewed from three locations. In view 1, the viewing priority is that point A on object 30 is closer than point B on object 32. This priority is also valid for view 2, since points A and B do not overlap in this view. However, the priority is not correct for view 3, where points A and B overlap.

In the illustration of FIG. 7, the field of view from each viewpoint is indicated by a triangle 34. An angle θ is formed between the edge of one viewpoint's field of view and the center line (or optical axis) for the adjacent viewpoint. It has been determined that, as long as the angle θ is less than 90 degrees for adjacent viewpoints, the A–B priority of any two pixels does not need to be changed when moving from one viewpoint to the other. Thus, a view-independent visibility priority can be established for every source pixel for a given viewing range, by selecting the source images so that the angle θ is less than 90° between any two adjacent images.

In the implementation of view-independent visibility priority, when the offset maps are created, the pixels are ordered from back to front based on their original z coordinates. Subsequently, during the interpolation process, the pixels are displayed in back-to-front order. This ordering of the pixels eliminates the need to interpolate the z coordinate of each pixel during the interpolation process.

Since adjacent pixels tend to move together in the mapping from one image to another, a block compression technique, such as quadtree, can be employed to compress the offset maps 19. Adjacent pixels which move in a similar manner can be grouped in blocks 36, as shown in FIG. 8, and moved together. This compression serves two purposes. First, it reduces the size of the offset maps. Second, it allows offsets for entire blocks of pixels to be interpolated, rather than pixel-by-pixel. This second aspect of the block compression greatly accelerates the interpolation process, since the main effort in the process is the interpolation of the offset vectors.

The compression ratio that is employed can be related to the complexity of the image depth and the viewpoint movement. For images with high depth complexity, the compression ratio is preferably low. The ratio should also be lower as the movement of the viewpoint results in greater pixel depth change. A maximum offset threshold can be employed to determine the appropriate compression ratio. A maximum offset threshold of one or two pixels, for example, would mean that the offset vector coordinates for individual pixels within a block do not differ by more than one or two pixel units. Thus, as shown in FIG. 8, the various blocks can be of differing sizes, in dependence upon the variation in the magnitudes of the offset vectors. The threshold provides a smooth quality degradation path for increased performance. Large threshold factors result in fewer quadtree blocks and, therefore, reduce the interpolation time.

The view-independent visibility priority described above is applicable to the quadtree blocks. The priority can be assigned to every quadtree pixel block. Since the pixels within a block have similar offsets, they also have similar z coordinates. The z coordinates within a block can be averaged, or otherwise filtered, to determine a z-value for the block as a whole. This value is employed in a visibility priority sort. A sorted list of pixel blocks can thereby be created, which is the value for the entire range between two stored views.

Figure 9A:
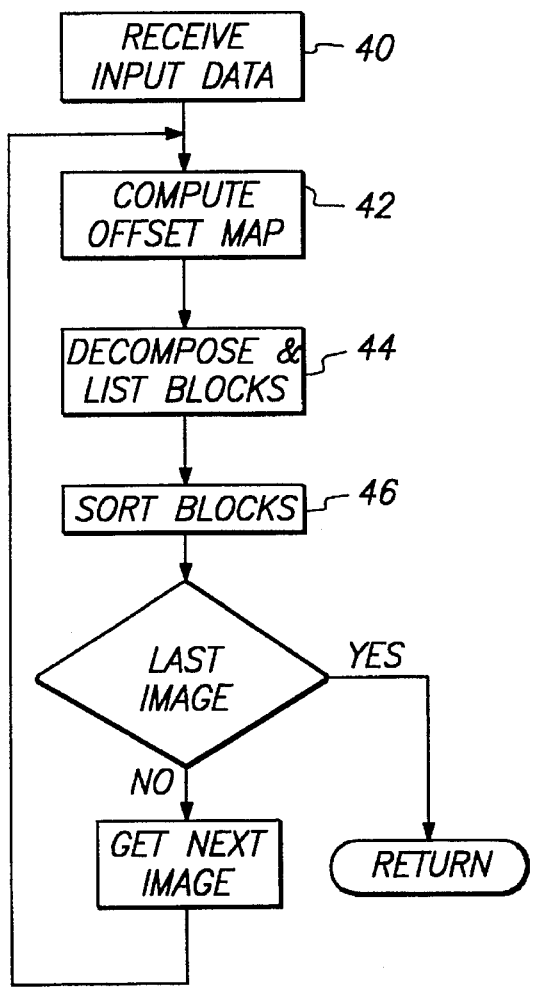
FIGS. 9A and 9B are flowcharts of the main steps involved in the implementation of the present invention.
Figure 9B:
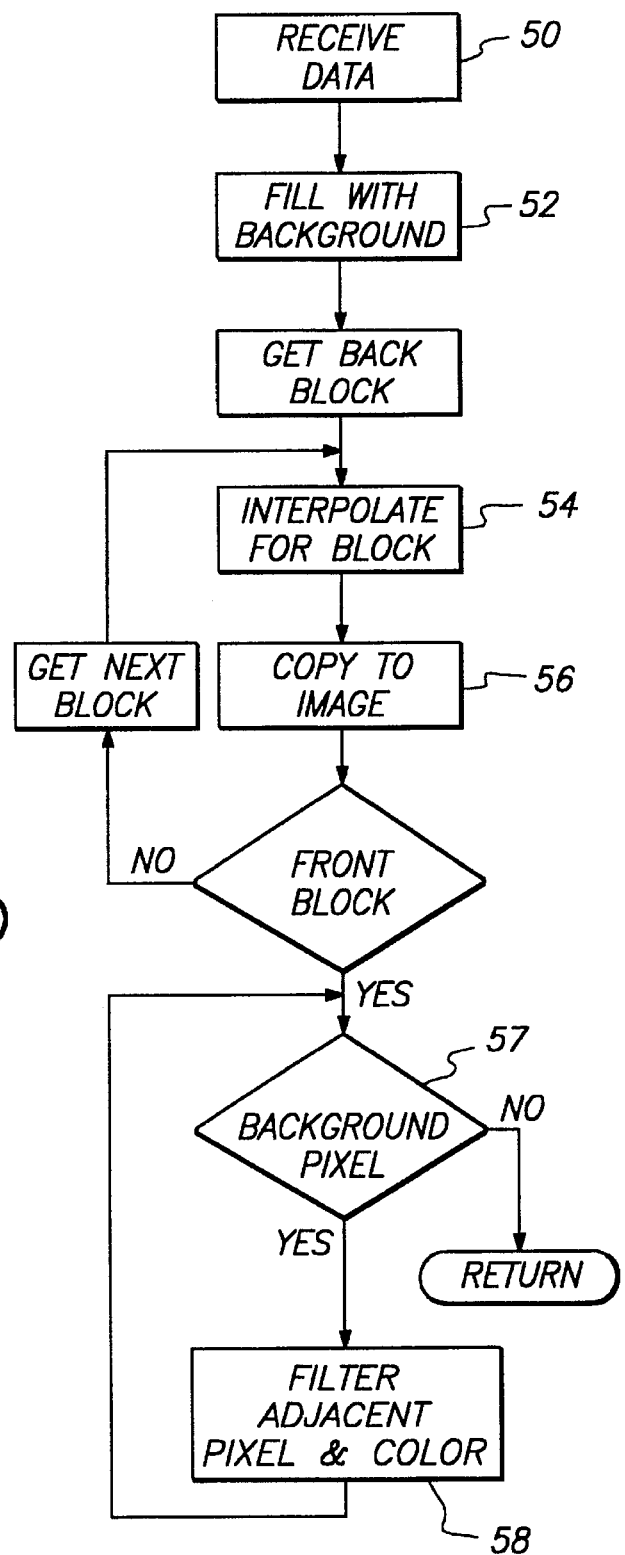

The foregoing aspects of the present invention are summarized in the flowcharts of FIGS. 9A and 9B. Generally speaking, the process of the present invention involves two main stages, a preprocessing stage and an interactive interpolation stage. In the preprocessing stage, the correspondence between each adjacent pair of source and destination images is established. This stage is the more computationally intensive, and can be carried out in advance, using as much time as is necessary. In the interpolation stage, a new image is generated to correspond to a new viewing location. This stage is implemented in real time, at interactive rates.

The steps of the preprocessing stage are depicted in FIG. 9A. As a first step 40, the appropriate input data is gathered and/or determined. This input data includes the source and destination images, as well as range data (z coordinates) and camera parameters associated with each image. The input data also includes a threshold factor for the quadtree decomposition. In the second step 42 of the process, an offset map is created from the source to the destination image. The offset map is decomposed into quadtree blocks, and the blocks are added to a block list (step 44). The block list is then sorted from back to front, according to each block's respective z coordinates (step 46).

These steps are repeated for each set of adjacent stored images. For every pair of images, the steps are carried out twice, once in each direction.

The interactive interpolation stage is illustrated in FIG. 9B. As a first step 50, input data, comprising interpolation parameters and a sorted block list, are obtained. The interpolation parameters are the parametric coordinates of the new viewing location, relative to the viewing locations of adjacent stored images. In the second step 52, the interpolated image is filled with a distinctive background color. A new location is computed for each block in the block list, going from back to front (step 54). As the location of each block is determined, it is copied to that location in the interpolated image (step 56). After all of the blocks have been copied to the new image, each pixel which retains the background color is identified (step 57), and its color is computed by filtering the colors of adjacent non-background pixels, or the offset vectors of the adjacent pixels (step 58).

In the example of FIG. 1, the movement of the virtual camera is one-dimensional. In practical applications of the invention, the user's control over the displayed scene can be multi-dimensional. For example, the views of the teapot 10 can be taken from any point on a sphere which completely surrounds the teapot, rather than only a ring. An array of prestored images is determined for selected points on the sphere. These images can be connected to form a graph, where each node on the graph comprises a source image and each arc in the graph (connecting any two adjacent nodes) represents the correspondence mapping between the images. Since the mapping is bidirectional, two maps are associated with each arc.

An example of a portion of an image array is shown in FIG. 10. In the graph, the images are grouped in sets of three, so that the arcs 60 between adjacent image nodes 62 form triangles. A scene can be viewed from any point encompassed by the triangle. For a viewpoint 64 located along one of the edges 60 of the triangle, the interpolation is carried out with two offset maps from two source images, as explained with reference to the example of FIG. 1. For a viewpoint 66 located within the triangle, its barycentric coordinates are determined, and used to interpolate from among three source images.

More particularly, in the example of FIG. 10, each pixel in image A will have two offset vectors associated with it. One vector identifies that pixel's displacement in going from image A to image B, and the other vector corresponds to the pixel's displacement in going from image A to image C. The barycentric coordinates of the viewpoint 66 determine the coefficients by which each of these vectors is scaled. Each scaled vector represents an interpolated image, and all of the interpolated images (in this case, three) are combined to form a composite image that is displayed.

From the foregoing, it can be seen that the changes in the displayed scene can be multi-dimensional and are determined by multivariate interpolation. Furthermore, the dimensions can be other than spatial, e.g. they can relate to object movement or surface distortions. The changes in each dimension are accompanied by an appropriate correspondence map, which is employed in the multivariate interpolation. As more dimensions are added, the view-independent visibility priority may no longer apply. In such a case, it may be appropriate to include range data with each sample or block of samples, to effect compositing of images.

The ability of the present invention to rapidly generate a large number of scenes facilitates the simulation of motion in a displayed scene. For example, if the camera's location is moved at a rapid rate some of the objects in the scene may appear blurred. In the present invention, such blurring can be simulated through a temporal sampling technique. If an image of a motion sequence is rendered for an instant of time, rather than a time interval, the motion will appear to be jerky, and the image is said to be aliased in the temporal domain. One conventional technique to perform temporal anti-aliasing is super-sampling. The motion is sampled at a higher rate in the temporal domain, and the samples are filtered to the display rate. Super-sampling requires the computation of many more samples. For images which require a significant amount of processing to render, this technique can be computationally expensive.

The morphing method of the present invention allows additional temporal samples to be created by interpolation. The interpolation time is constant regardless of the complexity of the images being interpolated. The sampling rate is determined by the largest offset vector from the morph map, in order to perform proper anti-aliasing.

When a super-sampling approach is employed, the sampling rate is determined on the basis of the worst case. If an image has a fast moving object and slowly moving background, the super-sampling approach is not very efficient. One way to improve upon this approach is to segment the images based on object movement, and use different sampling rates for each segment. For instance, a foreground object in a scene should be sampled at a high rate, while a stationary wall in the background needs only a few samples. In the case of motion caused by viewpoint changes, the different segments can be sorted in order of depth. Each segment is filtered independently and a temporal coverage value is stored for each pixel, to indicate the ratio of background samples relative to all samples. The multiple segment layers are composited in front-to-back order, with each segment's pixel colors attenuated by the coverage value. The function of the coverage value, therefore, is to normalize the brightness of all of the pixels, so that the pixels which have been sampled a greater number of times do not have their brightnesses artificially increased.

Figure 11A:
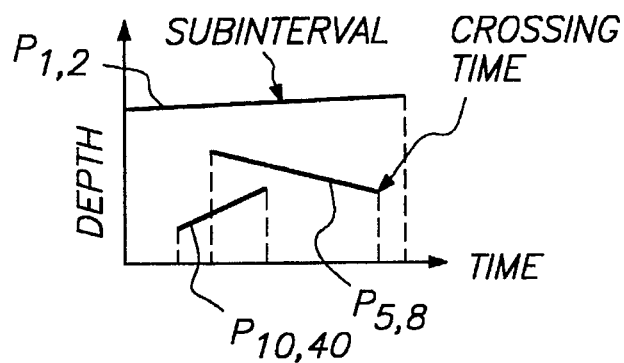
FIG. 11A and 11B are graphs of a temporal visibility function for a pixel in a target image.
Figure 11B:
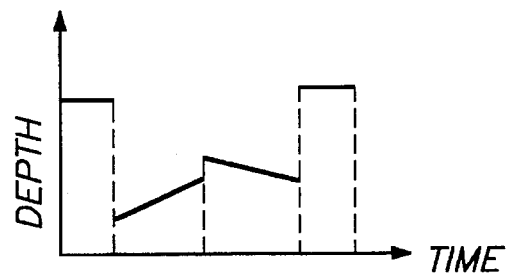

Another approach to anti-aliasing motion is to generate a continuous temporal visibility function for each pixel from the mapping. By treating a pixel in the destination image as a window, this continuous function describes when and which source pixels cross the window over a predetermined time interval. Referring to FIGS. 11A and 11B, the continuous function can be computed by moving all of the source image pixels to their destinations, and recording the time they cross each target pixel's center. After this process, each target pixel has a list of records for the source pixels which have crossed the target pixel in the time interval. As shown in FIG. 11A, each record contains an identification of the source pixel's coordinates, Pxy, and a sub-interval for the crossing times. This list is then sorted by the z-coordinates, and occluded sub-intervals are deleted, as shown in FIG. 11B. The remaining list is a continuous function and can be integrated for any time interval to simulate motion.

Another application of the present invention is in the rendering of shadows. In a conventional approach, a shadow buffer algorithm was computed using a z-buffer, or shadow map, from the point of view of a light source. To compute shadows, the coordinates of a surface point in an image were transformed to the light source's space, and its z-coordinates compared to the corresponding z-coordinates in the shadow map. While this approach is acceptable for point light sources, it is not very efficient for the approximation of linear or area sources, which require many different point light sources to be employed.

Figure 12:
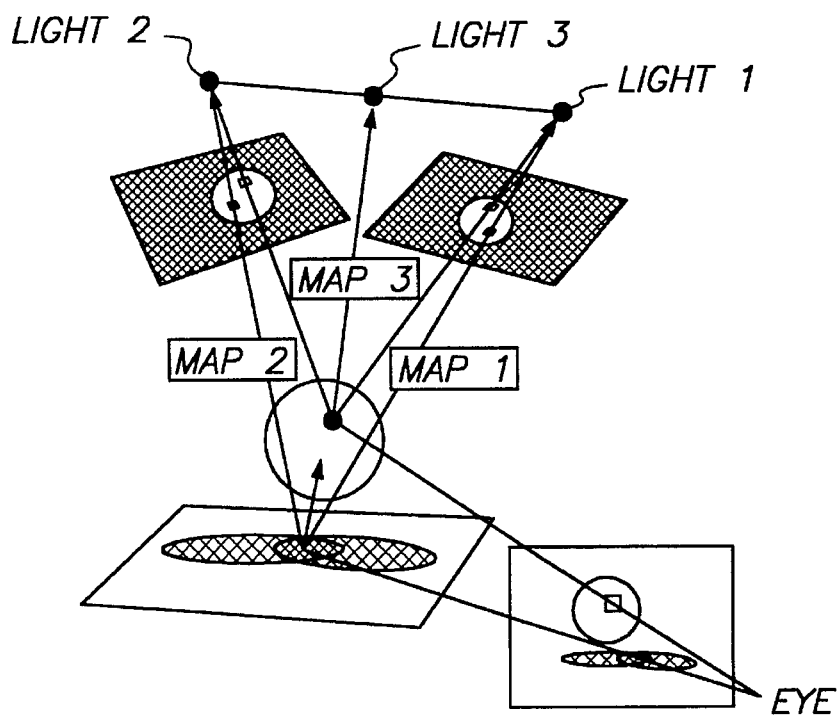
FIG. 12 is an illustration of the application of the invention to the generation of soft shadows.

The morphing method of the present invention can be used to significantly reduce the cost of computing a shadow map for each of the point sources. Referring to FIG. 12, a shadow map is computed first for each of the two end points light1 and light2 of a linear light source, using a conventional rendering method. Interpolation maps, map1 and map2, from the viewpoint to each of the two end points are also computed, to transform the scene coordinates to each point source's coordinate space. A shadow map for an intermediate point, light3, on the linear source is interpolated from the end point shadow maps, using the morphing method. The same interpolation factor is used to interpolate the two interpolation maps, to create a map from the viewpoint to the intermediate light source point. A standard shadow buffer algorithm can then be employed to compute shadows for the intermediate point source. This process is repeated for all intermediate points at a desired interval. The resulting shadow images are composited, to create a soft shadow of the linear source.

From the foregoing, it can be seen that the present invention employs images and environment maps to represent a three-dimensional scene. To view the scene from different perspectives, images adjacent to a viewpoint are interpolated to create the desired view. With this method, only a few key images are required, and interpolation is used to generate in-between frames at interactive rates, regardless of scene complexity. This ability to generate images at an accelerated rate is a result of separating the slower process of computing image correspondence from the faster interpolation process, and carrying out the slow processes ahead of time.

The image morphing method of the present invention is computationally inexpensive and yet provides the capability to present images from any viewpoint in a defined range at a real-time rate. While a large amount of data may need to be stored, the amount needed to compute any given frame is relatively small and can be read from secondary storage, as needed. Thus, the approach of the present invention is quite appropriate for CD-ROM based devices, for example, due to their large storage capacity. As the complexity of geometric models increases, the advantages provided by the image-based approach of the present invention become more significant.

One important design decision in the image morphing method is the nature of the offset maps used to apply image deformations. In the foregoing discussion, maps may store new image coordinates for pixels in a source image, or offset vectors to these new image coordinates (from each pixel's original coordinates). Such a set of coordinates or offsets is termed a "forward mapping", as it maps each pixel to a new target location. Another possibility, often used in conventional image morphing, is to use an "inverse mapping". An inverse map is a set of coordinates or offsets, defined for each pixel in the target image, which specifies the location of pixels in a source image. To illustrate, for any two images, A and B, for which correspondences can be mapped, the forward map from A to B indicates where to move each pixel in A to arrive at a close approximation to image B. A new location is specified for every source pixel in such a mapping, but it does not guarantee that all target image pixels will be covered with a pixel from the source image, and so (as previously discussed) "holes" may arise. The inverse map from A to B indicates, for each pixel in image B, the coordinates (or offsets) of corresponding pixels in image A. In using the inverse map, no holes occur, since every target pixel has a defined source pixel in the undeformed image. On the other hand, defining the source pixel coordinates for regions outside the on-screen boundaries of an object that does not fill the screen (like the teapot) may be problematic. In order to achieve reasonable results when interpolating inverse maps, the regions of the maps outside the boundaries of objects should contain coordinates or offsets extrapolated from the coordinates or offsets within object boundaries. The boundaries themselves, which delimit the visible portions of objects, can be represented separately, as mattes. A matte is an extra component of the image—along with the red, green, and blue components—which defines the opacity of the image at each point. The mattes for the source and target images in a morph are indexed, deformed, and composited in the same way as the red, green, and blue components of the images.

It will be appreciated that the foregoing examples of the invention are illustrative only, and that the invention can be embodied in other specific forms without departing from the spirit or essential characteristics thereof. For example, while the use of linear interpolation has been described in the illustrated embodiments, other types of interpolation, such as quadratic or cubic, can also be employed to provide improved accuracy in the interpolated image. The disclosed embodiments, therefore, should not be considered to be restrictive in any sense. The scope of the invention is indicated by the appended claims, rather than the preceding description, and all variations which fall within the meaning and range of equivalents thereof are intended to be embraced therein.

What is claimed is:

1. A method for synthesizing views of a three-dimensional scene, comprising the steps of:

storing a plurality of two-dimensional images of the scene from different respective source viewpoints;

for each pair of images relating to adjacent viewpoints, determining and storing a map which identifies correspondence of pixels in the two images;

identifying a viewpoint located between at least two of said source viewpoints;

determining a coefficient relating to the location of said intermediate viewpoint relative to said source viewpoints;

morphing at least one of said images in accordance with said coefficient and the information contained in at least one of said maps to produce an interpolated image which defines the view from said intermediate viewpoint; and displaying the interpolated image.

2. The method of claim 1 wherein multiple images are morphed, using multivariate interpolation, to produce a composite image that comprises said interpolated image.

3. The method of claim 1 wherein a pair of bidirectional offset maps are determined and stored for each pair of adjacent images.

4. The method of claim 1 wherein each map contains offset vectors which describe spatial displacement of image pixels in going from one image to another.

5. The method of claim 1, further including the step of decomposing said maps into blocks of pixels, in accordance with a compression threshold.

6. The method of claim 5, wherein the offset map identifies the correspondence of groups of pixels in the two images.

7. The method of claim 5, further including the step of sorting the blocks of pixels within a map in accordance with range information.

8. The method of claim 7 wherein said step of producing an interpolated image includes the steps of:

copying pixel blocks from the source image to the destination image in said sorted order;

identifying pixels in the destination image to which no pixel from the source image was copied; and for each identified pixel, filtering a parameter associated with at least one pixel in the neighborhood of said identified pixel, to compute a display value for the identified pixel.

9. The method of claim 8 wherein said parameter is the color of the adjacent pixel.

10. The method of claim 8 wherein said parameter is a displacement value for the adjacent pixel.

11. The method of claim 1, wherein each source viewpoint has an associated field of view defined by a central axis and edge boundaries, and wherein said source viewpoints are selected such that the angle between the edge boundary of one viewpoint and the central axis of an adjacent viewpoint does not exceed 90°.

12. A system for generating a sequence of related images corresponding to different views of a scene, comprising:

means for storing an array of images which correspond to views of the scene from different respective source viewpoints;

means for determining correspondence between adjacent images in said array and storing maps which identify said correspondence;

means for indicating a new viewpoint located between at least two of said source viewpoints;

means for interpolating information in at least one of said maps to produce an interpolated image corresponding to a view of the scene from said new viewpoint; and means for displaying the interpolated image.

13. The system of claim 12 further including means for decomposing said maps into blocks of pixels, wherein the pixels in each block have a common characteristic relating to the correspondence between images.

14. The system of claim 13 wherein said decomposing means includes means for determining the value of a parameter for each block which relates to distance from a viewpoint, and means for storing said blocks in an order determined by said parameter values.

15. The system of claim 14 wherein said interpolating means interpolates and displays said blocks in said stored order.

16. The system of claim 12 wherein said array is multi-dimensional, and said interpolated image is interpolated from at least two of said maps.

17. The system of claim 12, wherein said interpolating means comprises means for morphing pixel data for at least one of said images in accordance with the information in said at least one map.

18. A method for synthesizing views of a scene, comprising the steps of:

storing two images of the scene from two different reference source points;

determining and storing a map which identifies correspondence of pixels in the two images;

identifying a plurality of intermediate locations between said reference source points;

for each intermediate location, determining a coefficient relating to its location relative to said reference source points, and morphing at least one of said images in accordance with said coefficient and information contained in at least one of said maps to produce an interpolated image for said intermediate location; and combining the interpolated images for the plurality of intermediate locations to produce a composite image.

19. The method of claim 18 wherein said reference source points are the respective ends of a linear light source, and said composite image comprises a soft shadow of the light source.

20. A method for synthesizing views of a three-dimensional scene that contains a moving object, comprising the steps of:

storing a plurality of source images of the scene from different respective source viewpoints, where each image is comprised of pixels having data associated therewith;

for each pair of source images relating to adjacent viewpoints, determining and storing a map which identifies the correspondence of pixels in the two images;

identifying a viewpoint between at least two of said source viewpoints;

determining a coefficient relating to the location of said intermediate viewpoint relative to said source viewpoints;

morphing pixel data for at least one of said source images to corresponding pixel locations in a destination image which defines a view from said intermediate viewpoint, in accordance with said coefficient and the information contained in at least one of said maps;

determining a time interval;

for at least selected ones of the pixel locations in said destination image, determining a portion of said time interval during which a pixel from said one source image crosses the location of a selected pixel; and displaying the pixel from said one source image in the selected pixel of said destination image during the determined portion of the time interval.

21. The method of claim 20 further including the steps of determining whether at least two pixels from said source image cross the selected pixel of the destination image during the same portion of said time interval, establishing a depth value for each pixel in the source image, and displaying one of said two pixels during said portion of said time interval in accordance with their respective depth values.

\* \* \* \* \*